(12) United States Patent
Mima et al.

(10) Patent No.: US 9,755,526 B2
(45) Date of Patent: Sep. 5, 2017

(54) POWER CONVERTER

(71) Applicant: Hitachi, Ltd., Chiyoda-ku, Tokyo (JP)

(72) Inventors: Akira Mima, Tokyo (JP); Hiroshi Kamizuma, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/044,430

(22) Filed: Feb. 16, 2016

(65) Prior Publication Data
US 2016/0276938 A1    Sep. 22, 2016

(30) Foreign Application Priority Data

Mar. 16, 2015 (JP) .................................. 2015-052095

(51) Int. Cl.
*H02M 3/335* (2006.01)
*H02J 1/10* (2006.01)

(52) U.S. Cl.
CPC ........... *H02M 3/33507* (2013.01); *H02J 1/10* (2013.01)

(58) Field of Classification Search
CPC .............................. H02M 3/33507; H02J 1/10
USPC ................................. 363/21.01; 323/222–224
See application file for complete search history.

(56) References Cited

U.S. PATENT DOCUMENTS

| | | | | |
|---|---|---|---|---|
| 5,631,814 A * | 5/1997 | Zak | ......................... | H02J 9/061 307/66 |
| 6,477,063 B2 * | 11/2002 | Ishii | .................. | H02M 3/33561 323/222 |
| 7,551,462 B2 * | 6/2009 | Uruno | .................... | H02M 3/158 363/21.02 |
| 9,252,671 B2 * | 2/2016 | Klein | ................. | H02M 3/33507 |
| 2005/0088860 A1 * | 4/2005 | Okuma | ................... | H02J 9/062 363/35 |
| 2006/0176719 A1 * | 8/2006 | Uruno | ................... | H02M 3/158 363/89 |
| 2006/0274468 A1 * | 12/2006 | Phadke | ................. | H02M 7/125 361/93.1 |
| 2008/0211461 A1 * | 9/2008 | Ichimasa | ................ | G03B 15/05 320/166 |

(Continued)

FOREIGN PATENT DOCUMENTS

| JP | 2009-11042 A | 1/2009 |
|---|---|---|
| JP | 2014-14273 A | 1/2014 |

OTHER PUBLICATIONS

Received search report from STIC EIC 2800 searcher Benjamin Martin on Dec. 22, 2016.*

*Primary Examiner* — Timothy J Dole
*Assistant Examiner* — Htet Z Kyaw
(74) *Attorney, Agent, or Firm* — Crowell & Moring LLP

(57) ABSTRACT

A power converter that can be made compact and lightweight is provided. The power converter includes a control circuit power supply, a power semiconductor module that includes power conversion elements, a control circuit board that operates with power from the control circuit power supply and controls the power conversion elements, and a capacitor connected to the power conversion elements. In the power converter, the control circuit power supply charges the capacitor through the control circuit board. With this configuration, hot swapping of the power converter from the converter system can be performed. A boosting circuit may boost voltage of the control circuit power supply to charge the capacitor.

11 Claims, 7 Drawing Sheets

(56) References Cited

U.S. PATENT DOCUMENTS

| | | | |
|---|---|---|---|
| 2009/0027925 A1* | 1/2009 | Kanouda | H02M 1/4233 363/21.13 |
| 2009/0033294 A1* | 2/2009 | Odajima | B60L 11/005 320/166 |
| 2012/0236617 A1* | 9/2012 | Hamanaka | H02M 1/08 363/132 |
| 2013/0070502 A1* | 3/2013 | Suzuki | H02M 7/003 363/131 |

* cited by examiner

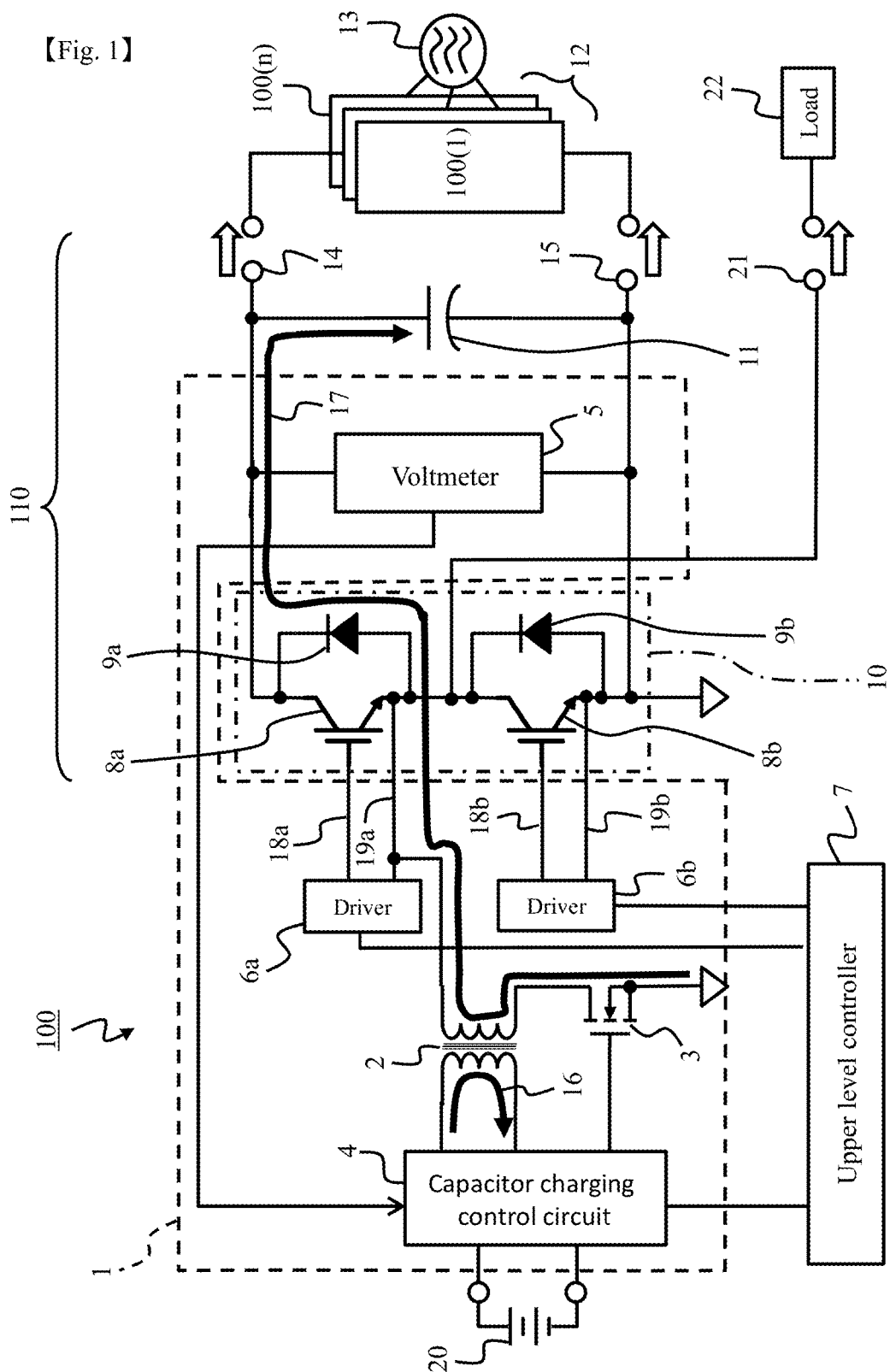
[Fig. 1]

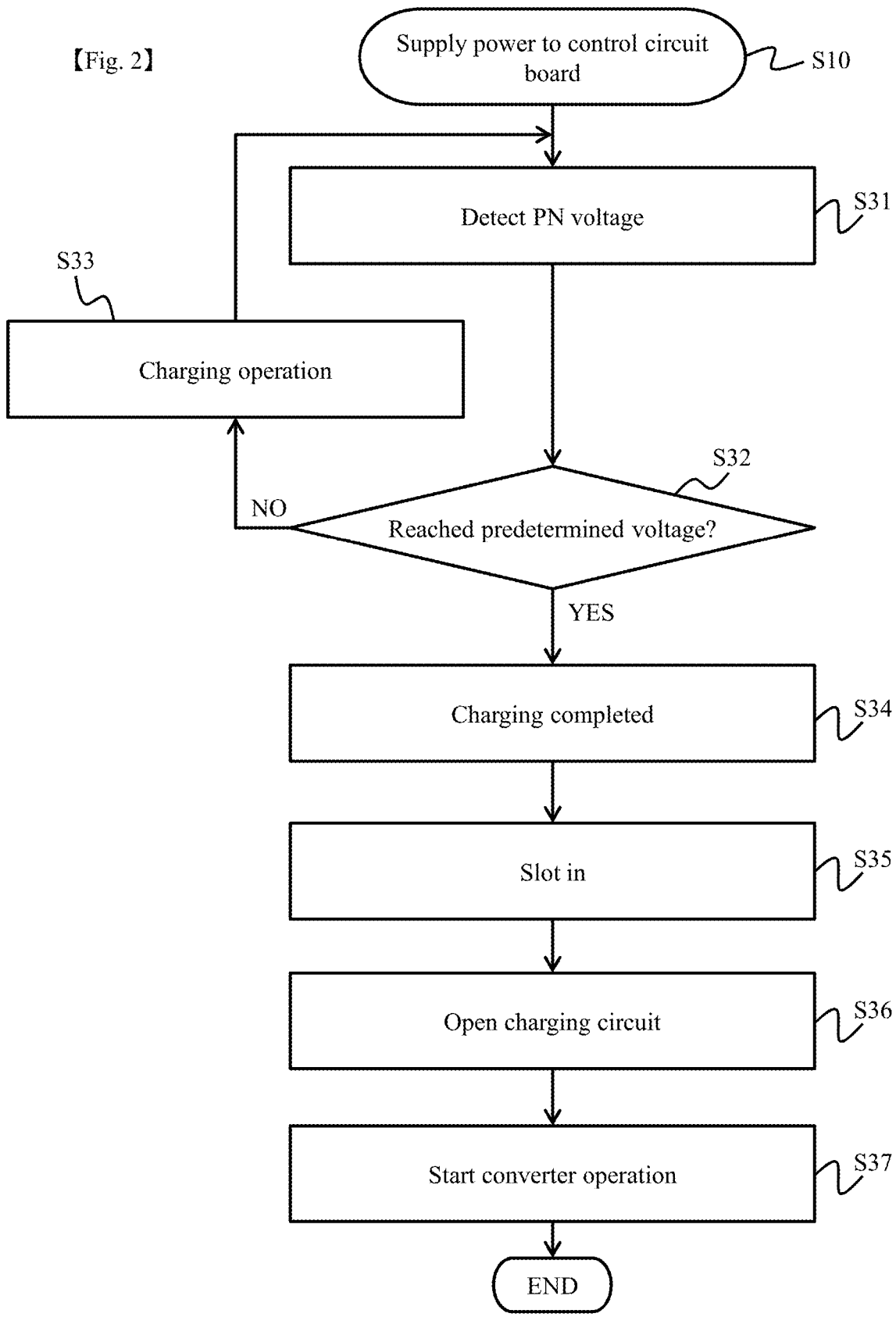

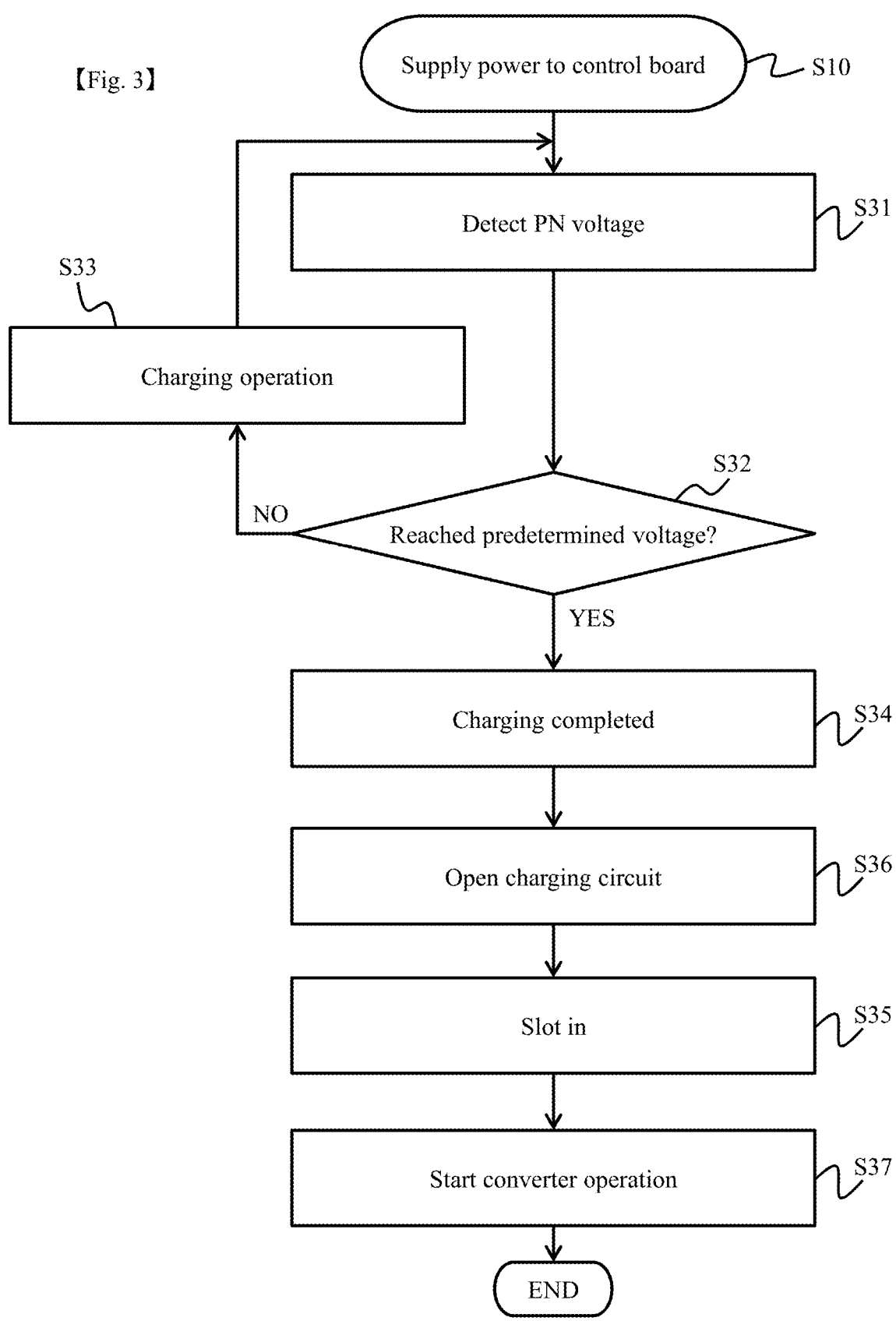

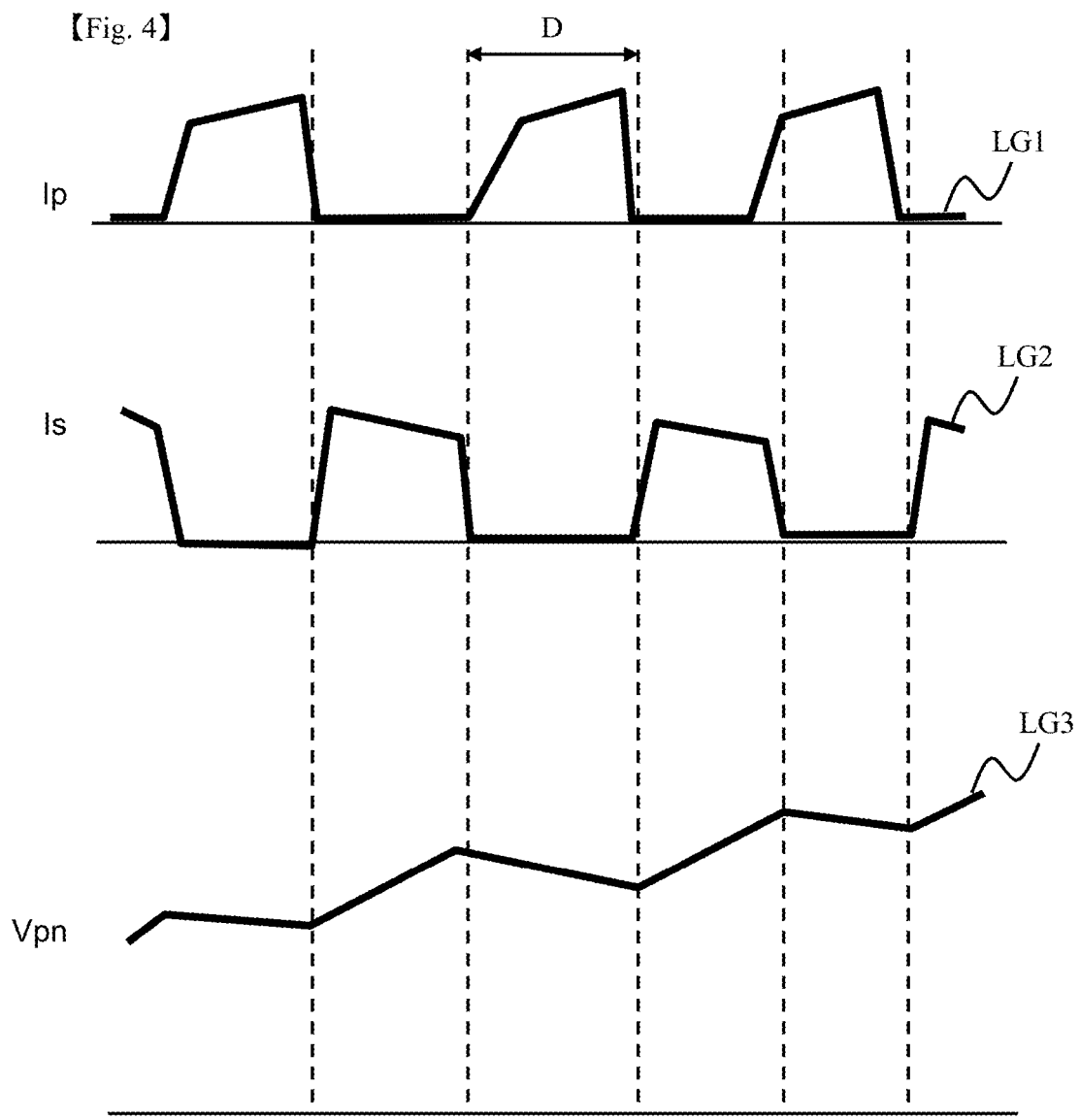

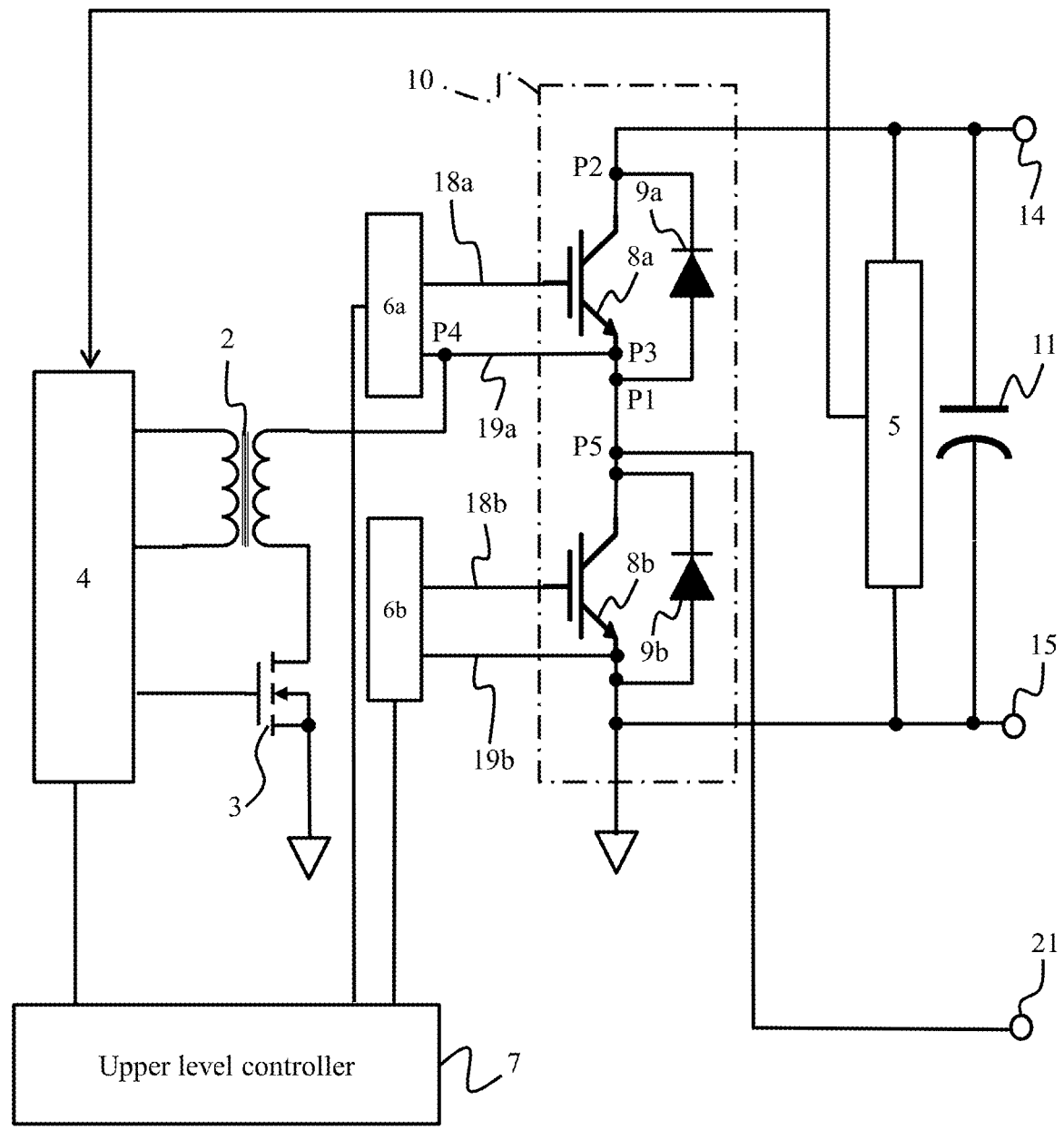
[Fig. 5]

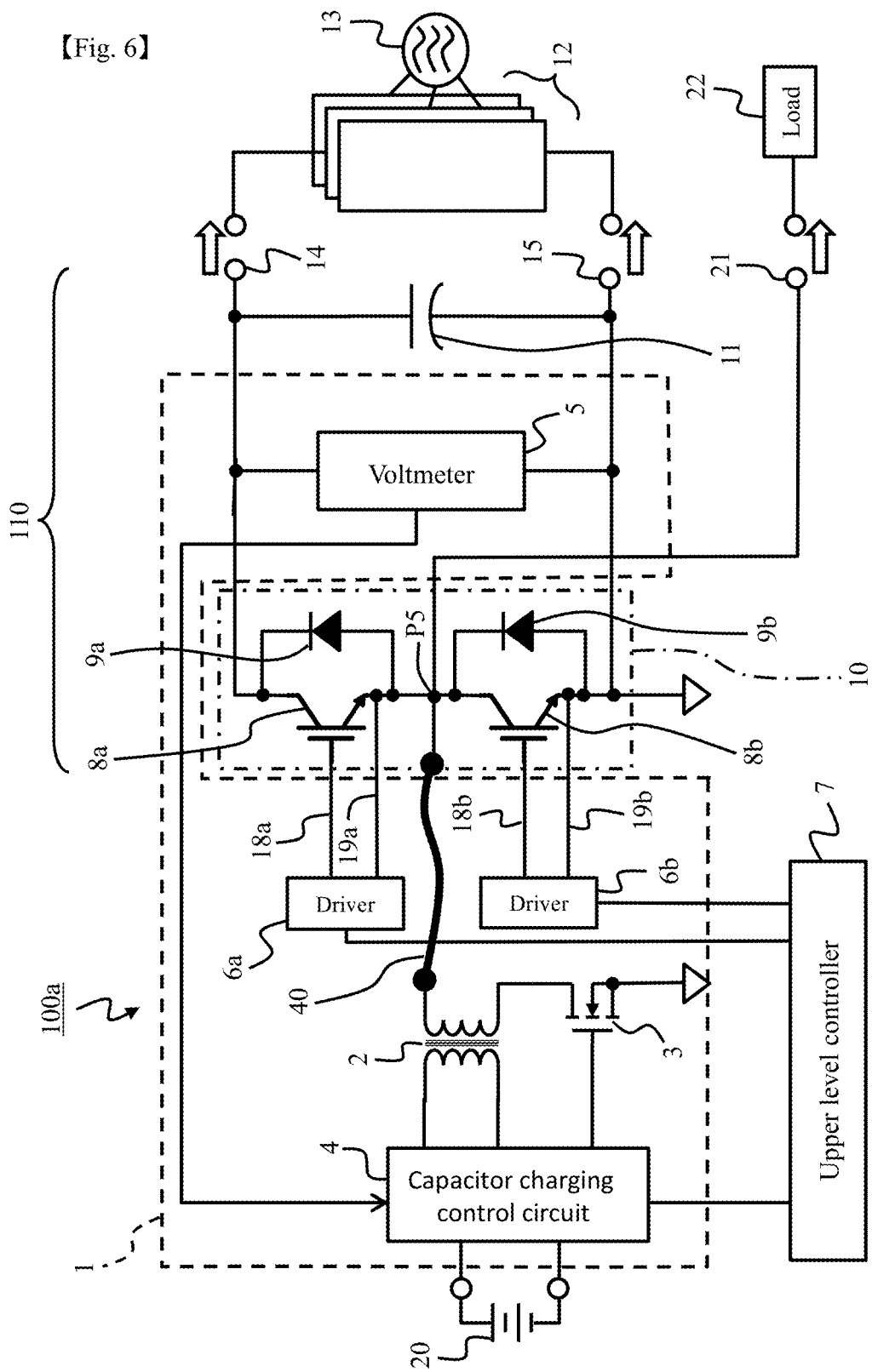
[Fig. 6]

[Fig. 7]
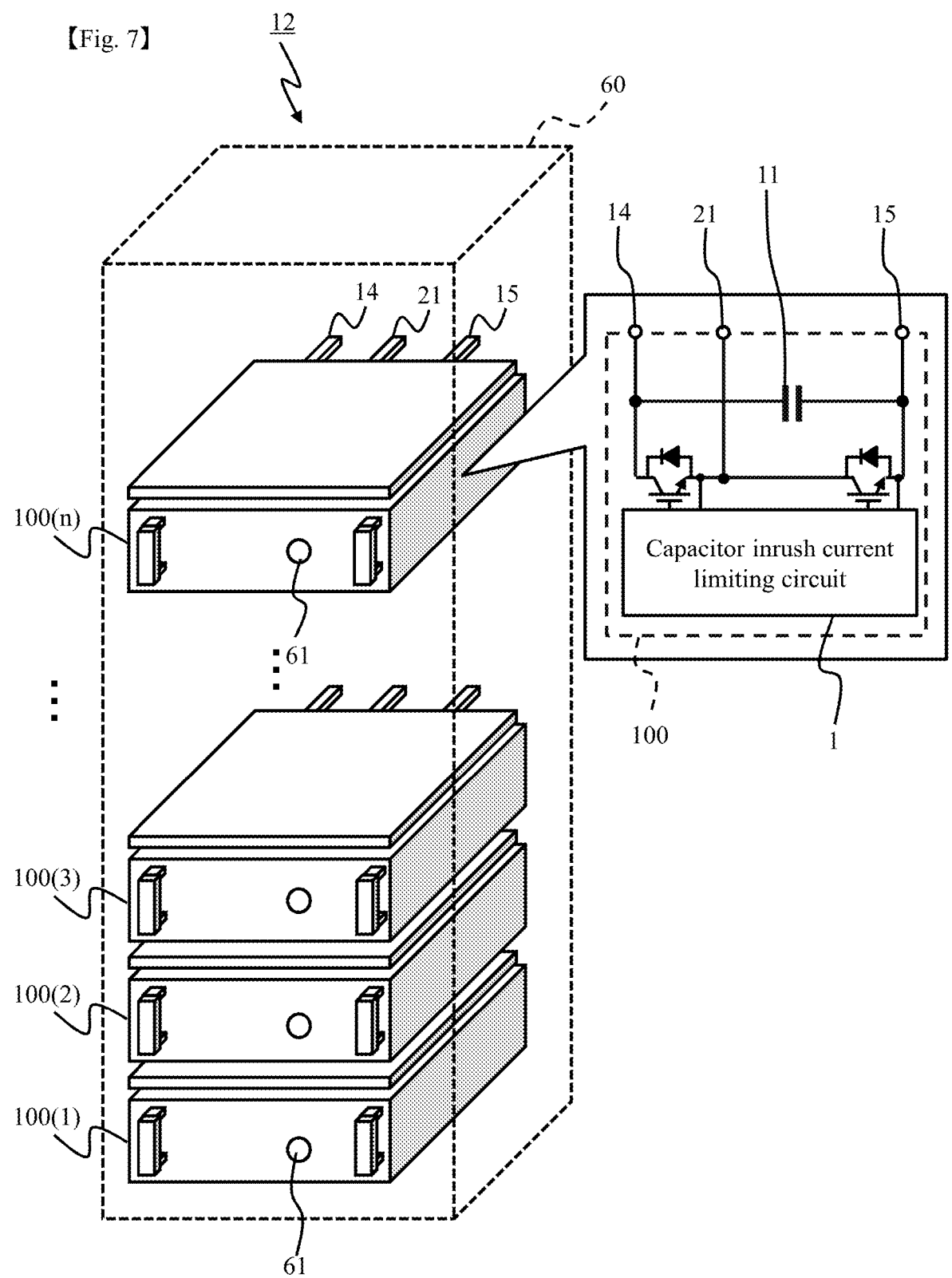

POWER CONVERTER

BACKGROUND OF THE INVENTION

1. Field of the Invention

The present invention relates to a power converter.

2. Description of the Related Art

In recent years, as power converters, inverters having higher power density are demanded. A power converter system, used in a data center, includes a plurality of power converters that have common and integrated components to facilitate an attempt to achieve a compact, lightweight, and low cost system.

During maintenance, a worker takes out a subject power converter from the power converter system, and performs work such as exchanging and maintenance. Then, the worker attaches a new power converter or the power converter after the maintenance work to the power converter system. Here, the power converter needs to be detached and attached while the power converter system is operating, and thus needs to be what is known as hot swappable power converter.

When the hot swapping of the power converter from the power converter system is performed, inrush current to a capacitor in the power converter needs to be limited to prevent the capacitor from being broken by the inrush current. Thus, the power converter is provided with an inrush current limiting circuit that limits the inrush current to the capacitor (Japanese Patent Application Laid-open No. 2009-11042 and Japanese Patent Application Laid-open No. 2014-14273).

In a conventional technique described in Japanese Patent Application Laid-open No. 2009-11042, a charging resistor and a relay switch are connected in parallel with the capacitor. Thus, when a connection with a grid is established, pre-charging of the capacitor is performed through the charging resistor, and when the charging is completed, the relay switch is turned ON, whereby the capacitor is connected to the grid through the relay switch.

In a conventional technique described in Japanese Patent Application Laid-open No. 2014-14273, the relay switch and the charging resistor are provided in a power semiconductor unit. When the hot swapping is performed, voltage at both ends of the capacitor in the power semiconductor unit is detected, and in accordance with this voltage at both ends, switching between the relay switch and the charging resistor is performed.

SUMMARY OF THE INVENTION

In the conventional techniques, the inrush current to the capacitor is limited by switching between and using the charging resistor and the relay switch. The size, the weight, and the component cost of the relay switch and the charging resistor increase as normal rated power (NRP) increases. For example, in a large scale data center, the power converter system is required to have a higher performance every year. All things considered, it is difficult to develop a compact and lightweight power converter on the basis of the conventional techniques.

The present invention is made in view of the problem described above, and an object of the present invention is to provide a power converter that can have a smaller size and a lighter weight. Another object of the present invention is to provide a hot swappable power converter in which pre-charging of a smoothing capacitor is performed by using a control circuit power supply and a control circuit board, so that inrush current to the smoothing capacitor can be limited.

To solve the problem described above, a power converter according to one aspect of the present invention includes a control circuit power supply, a power semiconductor module that includes a power conversion element, a control circuit board that operates with power from the control circuit power supply and controls the power conversion element, and a capacitor that is connected to the power conversion element. The control circuit power supply charges the capacitor through the control circuit board.

In the present invention, charging of a capacitor can be performed by using existing circuits in a power converter such as a control circuit power supply and a control circuit board. Thus, a charging resistor and a relay switch need not be provided as in the conventional techniques, whereby a low cost power converter having a simple configuration can be obtained.

BRIEF DESCRIPTION OF THE DRAWINGS

FIG. 1 is a diagram illustrating a schematic configuration of a power converter according to an embodiment.

FIG. 2 is a flowchart illustrating processing of limiting an inrush current to a smoothing capacitor.

FIG. 3 is a flowchart illustrating a modification of processing of limiting the inrush current.

FIG. 4 is a waveform diagram illustrating a relationship among a primary side current and a secondary side current of a transformer as well as terminal voltage of the smoothing capacitor.

FIG. 5 is an enlarged view of a portion of a circuit.

FIG. 6 is a diagram illustrating a schematic configuration of a power converter according to a second embodiment.

FIG. 7 is a diagram illustrating a power converter system that accommodates a plurality of the power converters according to a third embodiment.

DESCRIPTION OF THE PREFERRED EMBODIMENT

Embodiments of the present invention are described below with reference to the drawings. In the embodiments, a smoothing capacitor 11 is prevented from being broken by an inrush current when a hot swapping is performed, and small voltage fluctuation is achieved as described later.

In the embodiments, pre-charging of the smoothing capacitor 11 is performed with a control circuit power supply 20. The pre-charging of the smoothing capacitor 11 is one example of "charging of a capacitor". More specifically, in the embodiments, voltage of the control circuit power supply 20 is boosted up to predetermined voltage with a transformer 2, and the pre-charging of the smoothing capacitor 11 is performed with the resultant voltage through a diode 9a in a power conversion element 8a.

A power converter 100 according to the embodiments includes upper and lower arms each including power conversion elements such as an insulated gate bipolar transistor (IGBT) 8a or 8b, a diode 9a or 9b, and the like. The transformer 2, a switch 3, and the like, as well as the power conversion elements, are mounted on a control circuit board 1 of the power converter 100. The transformer 2 has an input side connected to a capacitor charging control circuit 4, a first end on the output side connected to the switch 3, and a second end on the output side connected to an emitter potential terminal of the upper arm.

The switch 3 is ON, so that a charging circuit is closed, while the charging of the smoothing capacitor 11 is in process. Thus, power from the control circuit power supply 20 is boosted by the transformer 2, and then is supplied to the smoothing capacitor 11 through the diode 9a in the power conversion elements of the upper arm. For example, the control circuit power supply 20 includes a battery, a direct current (DC) commercial power supply, an alternating current (AC) commercial power supply, and the like, and supplies power to operate the control circuit board 1.

In the embodiments, the pre-charging of the smoothing capacitor 11 is performed with the control circuit power supply 20 as a power supply of the control circuit board 1. Thus, the hot swapping from a converter system 12 can be performed without using a relay switch, a charging resistor, and the like. Accordingly, in the embodiments, the power converter 100 need not be provided with a special component (the relay switch and the charging resistor) that is likely to be large and heavy when NRP is large, and thus can have a small size and a light weight. The pre-charging of the smoothing capacitor 11 is performed with the control circuit power supply 20, the diode 9a in the power conversion element, and the like that are existing components, and thus the power converter 100 can have a small size and a light weight without involving a large increase in manufacturing costs.

First Embodiment

A first embodiment is described with reference to FIGS. 1 to 5. In the present embodiment, a capacitor inrush current limiting circuit is implemented on the power converter with a part of an existing circuit configuration of the power converter as described later.

FIG. 1 is a diagram illustrating a configuration of the power converter 100 according to the present embodiment. The power converter 100 includes the control circuit board 1 and a power semiconductor module 10 controlled by the control circuit board 1. The power converter 100 is hot swappable from the converter system 12 including a plurality of power converters 100(1) to 100(n).

The control circuit board 1 has a function of limiting the inrush current to the smoothing capacitor 11, a function of drivingly controlling the power semiconductor module 10, and a function of forming a power unit 110 together with the power semiconductor module 10.

As described later, the function of limiting the inrush current to the smoothing capacitor 11 includes the transformer 2, the switch 3, the capacitor charging control circuit 4, the diode 9a of the upper arm of the power semiconductor module 10, and a voltmeter 5. The function of controlling the power semiconductor module 10 includes drivers 6a and 6b. The function of forming the power unit 110 includes the smoothing capacitor 11, a positive side (P side) connection terminal 14, a negative side (N side) connection terminal 15, and an output terminal 21.

The drivers 6a and 6b and the capacitor charging control circuit 4 that operate in accordance with a control signal from an upper level controller 7 are mounted on the control circuit board 1. The driver 6a of the upper arm drives the upper arm of the power semiconductor module 10 in accordance with the control signal from the upper level controller 7. The driver 6b of the lower arm drives the lower arm of the power semiconductor module 10 also in accordance with the control signal from the upper level controller 7.

The capacitor charging control circuit 4 controls the charging of the smoothing capacitor 11, based on voltage at both ends of the smoothing capacitor 11 detected by the voltmeter 5, and thus prevents a large inrush current from flowing to the smoothing capacitor 11 when the hot swapping is performed. The capacitor charging control circuit 4 operates by using power from the control circuit power supply 20.

The transformer 2, serving as a "boosting circuit", is a capacitor charging insulated transformer for generating the predetermined voltage used for pre-charging of the smoothing capacitor 11. The transformer 2 has a primary input side connected to the capacitor charging control circuit 4. Thus, primary side input current 16 output from the capacitor charging control circuit 4 at a predetermined timing flows through the primary side of the transformer 2. The transformer 2 has a first end on a secondary output side connected to the switch 3 and a second end on the secondary output side connected to an intermediate portion of an emitter terminal 19a connecting between the driver 6a of the upper arm and an emitter of the switching element 8a of the upper arm. The second end of the transformer 2 on the secondary output side is connected to emitter potential of the upper arm of the power semiconductor module 10 through the emitter terminal 19a, and connected to the smoothing capacitor 11 through the diode 9a having an anode connected to the emitter potential. The diode 9a of the upper arm has a cathode connected to the positive side of the smoothing capacitor 11 and the anode connected to an emitter side of the switching element 8a.

The boosting operation of the transformer 2 is turned ON and OFF with the secondary output side of the transformer 2 opened and closed by the switch 3. When primary side current 16 is supplied from the capacitor charging control circuit 4 to the transformer 2 in a state where the switch 3 is closed, secondary side output current 17, as a result of the boosting to the predetermined voltage, is generated on the secondary side of the transformer 2. The secondary side output current 17 flows to the positive side of the smoothing capacitor 11 through the emitter terminal 19a, the emitter potential of the switching element 8a, the cathode of the diode 9a, and the anode of the diode 9a. The voltmeter 5 detects voltage between the positive and the negative sides of the smoothing capacitor 11, and transmits the detection result to the capacitor charging control circuit 4.

As described above, the power unit 110 includes: the 2-in-1 power semiconductor module 10 including the upper and the lower arms; the capacitor 11 for voltage smoothing; a positive side connection terminal 14; a negative side connection terminal 15; and the output terminal 21. The smoothing capacitor 11 has a positive side connected to the positive side connection terminal 14 and a negative side connected to the negative side connection terminal 15. The output terminal 21 is connected to an electrical load 22.

The power semiconductor module 10 includes: the switching element 8a of the upper arm; the diode 9a serving as a recirculation element of the upper arm; the switching element 8b of the lower arm; and the diode 9b serving as a recirculation element of the lower arm.

The switching element 8a of the upper arm has an upper arm gate terminal 18a and an upper arm emitter terminal 19a serving as control signal terminals. Similarly, the switching element 8b of the lower arm has a lower arm gate terminal 18b and a lower arm emitter terminal 19b serving as control signal terminals. The control signal terminals 18a and 19a of the upper arm are connected to the driver 6a of the upper arm. The control signal terminals 18b and 19b of the lower arm are connected to the driver 6b of the lower arm. The driver 6a of the upper arm and the driver 6b of the lower arm can operate independently from each other. The upper level controller 7 controls a control signal output from the driver 6a of the upper arm and a control signal output from the driver 6b of the lower arm.

The components forming the capacitor inrush current limiting circuit are preferably mounted on a single board (control circuit board 1). The components forming the capacitor inrush current limiting circuit include the capacitor charging insulated transformer 2, the switch 3 for opening the secondary output side of the transformer 2, the circuit 5 for detecting the voltage at both ends the smoothing capacitor 11, and the drivers 6a and 6b, as described above.

For example, the control circuit power supply 20 is at least any one of a battery, a power supply device connected to a DC commercial power supply, and a power supply device connected to an AC commercial power supply. The control circuit power supply 20 may be provided outside of or on the control circuit board 1. In the present embodiment, the pre-charging of the smoothing capacitor 11 is performed with the control circuit board power supply 20 and a charging circuit provided on the control circuit board 1. The charging circuit also limits the inrush current flowing to the smoothing capacitor 11.

The charging circuit (capacitor inrush current limiting circuit) includes the transformer 2, the switch 3, the capacitor charging control circuit 4, the capacitor diode 9a, and the upper arm emitter terminal 19a. Of these components 2, 3, 4, 9a, and 19a, the transformer 2, the switch 3, and the capacitor charging control circuit 4 are feature components in the present embodiment. The remaining components 9a and 9b are existing elements in a normal control circuit board.

Generally, in the power converter 100 using power semiconductor elements (the switching elements 8a and 8b and the diode 9a and 9b), processing of applying voltage to a main circuit terminal of the power semiconductor element in a state of being turned OFF is executed so that the power semiconductor element can be prevented from being broken. Thus, the processing is executed by operating the drivers 6a and 6b by supplying control voltage to the drivers 6a and 6b from the control circuit power supply 20.

A flowchart illustrated in FIG. 2 is described. In the present embodiment, a worker or a robot operates an unillustrated switch so that the power is supplied to the control circuit board 1 from the control circuit power supply 20 (S10). The capacitor charging control circuit 4 detects the voltage at both ends of the power semiconductor module 10 (S31). The voltage at both ends of the power semiconductor module 10 also represents the voltage at both ends of the smoothing capacitor 11 connected to the output side of the power semiconductor module 10. The capacitor charging control circuit 4 detects the PN voltage applied to the smoothing capacitor 11, with the voltmeter 5 (S31).

The capacitor charging control circuit 4 determines whether the voltage value detected by the voltmeter 5 has reached the predetermined voltage (S32). When the voltage at both ends of the smoothing capacitor 11 has not reached the predetermined voltage (S32: NO), the capacitor charging control circuit 4 performs the charging operation. The capacitor charging control circuit 4 closes the switch 3, so that the primary side current 16 flows to the primary side (input side) of the transformer 2. Thus, the charging current 17 flows to the secondary side (output side) of the transformer 2. The charging current flows into the smoothing capacitor 11 through the diode 9a of the upper arm and the like, whereby the smoothing capacitor 11 is charged. Thus, the voltage (PN voltage) at both ends of the smoothing capacitor 11 rises.

When the voltage at both ends the smoothing capacitor 11 reaches the predetermined voltage (S32: YES), the charging is completed (S34). The power converter 100 in which the charging has completed is slotted into the converter system 12 that is operating by the worker or the robot (S35), and connected to a grid 13 and the load 22.

For example, in step S10, the worker operates a power supply switch (not illustrated) of the control circuit board 1 so that the power is supplied from the control circuit power supply 20 to the control circuit board 1, and then waits for a predetermined time that is about ten to several tens of seconds, for example. The predetermined time is set in advance as the time long enough to charge the smoothing capacitor 11. When the predetermined time elapses, the worker (or the robot) inserts and thus attaches the power converter 100, in which the pre-charging of the smoothing capacitor 11 has been completed, to the converter system 12 that is operating.

Upon detecting that the attaching to the converter system 12 has been completed, the capacitor charging control circuit 4 opens the switch 3 (turns OFF the switch 3), and thus opens the charging circuit for the smoothing capacitor 11 (S36). The charging circuit can be automatically opened, or may be manually opened by the worker by issuing a command through an unillustrated switch.

Then, when the upper level controller 7 issues a pulse width modulation (PWM) command to the drivers 6a and 6b, the power converter 100 starts a converter operation (S37).

In a modification illustrated in FIG. 3, the power converter 100 may be slotted into the converter system 12 (S35), after the switch 3 is turned OFF and thus the charging circuit is opened (S36), and then the converter operation may be started (S37). In other words, steps S35 and S36 illustrated in FIG. 2 may be executed in the opposite order.

In the processing in FIG. 2 or 3, the converter operation preferably starts after the charging circuit is opened (S36). This is because when the converter operation starts while the switch 3 is closed and thus is in the ON state, the current flows to the charging transformer 2, and thus the power converter 100 fails to properly operate.

FIG. 4 is a waveform diagram illustrating waveforms in a state where the capacitor inrush current limiting circuit is operating. FIG. 4 illustrates a waveform LG1 (Ip) of the primary side input current 16 of the transformer 2, a waveform LG2 (Is) of the secondary side output current 17 of the transformer 2, and a waveform LG3 (Vpn) of the voltage at both ends of the capacitor 11. The horizontal axis in the figure represents time.

While the primary side input current 16 is flowing in the transformer 2 (on duty: D), energy is accumulated in the transformer 2. When the primary side input current 16 stops flowing, the energy accumulated in the transformer 2 is transferred to the output side, whereby the secondary side output current 17 starts to flow.

When the secondary side output current 17 starts to flow from the transformer 2, electric energy is transferred to the capacitor 11, whereby the voltage Vpn at both ends of the smoothing capacitor 11 rises. The capacitor charging control circuit 4 performs ON/OFF control of the primary side input current 16 of the transformer 2, so that the electric energy is transferred to the smoothing capacitor 11. Thus, the voltage at both ends of the smoothing capacitor 11 gradually rises. The voltage Vpn at both ends of the smoothing capacitor 11 can be obtained from input voltage Vin, a turn ratio N of the transformer 2, and the duty D, as in the following Formula 1.

$$Vpn = Vin * N * \left(\frac{D}{1-D}\right) \quad \text{[Formula 1]}$$

The duty D can be obtained as in the following Formula 2.

$$D = \frac{Vout}{Vout + (N * Vin)} \quad \text{[Formula 2]}$$

The transformer 2 preferably has a core having a gap so that the energy from the primary side input current 16 can be accumulated and transferred to the secondary side.

FIG. 5 is an enlarged circuit diagram illustrating a connection portion between the upper arm of the power semiconductor module 10 and the transformer 2.

The emitter of the switching element 8a of the upper arm and the anode of the diode 9a are connected to each other at a connection point P1. A collector of the switching element 8a of the upper arm and the cathode of the diode 9a are connected to each other at a connection point P2. The emitter terminal 19a, connecting between the driver 6a of the upper arm and the emitter of switching element 8a of the upper arm, is connected to the emitter of the switching element 8a at a connection point P3. The transformer 2 has the second end on the output side connected to the intermediate portion, that is, a connection point P4 of the emitter terminal 19a. The potential at each of the connection points P1, P3, and P4 may be regarded as being subsequently equivalent to the emitter potential. The power semiconductor module 10 and the output terminal 21 are connected to each other at a connection point P5 referred to in embodiments described later.

The upper arm gate terminal 18a and the upper arm emitter terminal 19a connect between the power semiconductor module 10 and the driver 6a of the upper arm. Similarly, the lower arm gate terminal 18b and the lower arm emitter terminal 19b connect between the power semiconductor module 10 and the driver 6b of the lower arm. The power semiconductor module 10 is connected to each of the drivers 6a and 6b through a signal connector or by directly soldering a control pin on the control circuit board 1, for example.

In the present embodiment, the transformer 2 has the first end on the output side connected to the connection point P4 with the same potential as the upper arm emitter terminal 19a. Thus, in the present embodiment, no new connection terminal needs to be additionally provided to establish connection between the second end of the transformer 2 on the output side and the smoothing capacitor 11. Accordingly, in the present embodiment, the charging circuit for the smoothing capacitor 11 can be implemented only by changing the wiring pattern of the control circuit board 1 and adding a component to the control circuit board 1, and thus the configuration of the power semiconductor module 10 need not be changed.

In the present embodiment with the configuration described above, the smoothing capacitor 11 can be charged with the control circuit power supply 20 used as the charging power supply, and thus the charge resistor and the relay switch need not be used. Thus, the power converter 100 of the present embodiment can be manufactured at a low cost to have a small size and a light weight, and can be hot swapped from the converter system 12.

Second Embodiment

A power converter 100a according to a second embodiment is described with reference to FIG. 6. The embodiments described below, including the present embodiment, are modifications of the first embodiment, and thus differences from the first embodiment are mainly described.

In the present embodiment, the transformer 2 has the second end on the output side not directly connected to the upper arm emitter terminal 19a, but connected to the output terminal 21 through a connection line 40. The potential at the connection point P5, where the output terminal 21 is connected to the power semiconductor module 10, is substantially the same as that at the emitter terminal 19a of the upper arm.

This configuration in which the second end of the transformer 2 on the output side and the connection point P5 are connected to each other through the connection line 40 such as a jumper wire, can obtain the same advantageous effects as the first embodiment. Instead of using the connection line 40, the output terminal 21 of the power semiconductor module 10 may be connected to the control circuit board 1 by soldering or with a connector.

Third Embodiment

A third embodiment is described with reference to FIG. 7 illustrating a schematic configuration of the converter system 12 including a plurality of the power converters described in the first or the second embodiment.

A rack 60 of the converter system 12 accommodates a plurality of power converters 100(1) to 100(n). Each of the power converters 100(1) to 100(n) is formed as a modular unit. For example, the number of power converters 100 accommodated in the rack 60 is determined based on the required amount of power. Each of the power converters 100(1) to 100(n) is connected to the upper level controller 7 disposed in an area outside the figure.

A display unit 61, displaying a charged state of the smoothing capacitor 11, is provided to each of the power converters 100(1) to 100(n). For example, the display unit 61 may be formed by using a light emitting diode (LED) lamp that may emit light with a predetermined display color (for example, green) when the voltage at both ends of the smoothing capacitor 11 reaches the predetermined voltage. The worker can recognize whether the charging of the smoothing capacitor 11 is completed by checking the display unit 61, and can insert and thus attach the power converter 100, in which the charging of the smoothing capacitor 11 is completed, to the rack 60. The display unit 61 is not limited to the LED lamp, and may be a liquid crystal display, a voice synthesizing device, and the like.

For example, in a maintenance work for the power converter 100, the nth power converter 100(n) can be hot swapped while the first to the (n−1)th power converters 100(1) to 100(n−1) are operating.

In the present embodiment, any power converter 100 can be taken out from the rack 60 while the converter system 12 is operating, when all the power converters 100(1) to 100(n) in the rack 60 are operating or when one or a plurality of the power converters 100 are not operating. In the present embodiment, the power converter 100 taken out or a new power converter 100 can be attached to the rack 60 while the converter system 12 is operating.

The present invention is not limited to the embodiments described above. A person skilled in the art can make various additions and modifications within the scope of the present invention.

What is claimed is:

1. A power converter comprising:
   a control circuit power supply;
   a power semiconductor module that includes a power conversion element and an upper arm and a lower arm;
   a control circuit board that operates with power from the control circuit power supply and controls the power conversion element, wherein the control circuit board has a switch;
   a capacitor that is connected to the power conversion element;
   a boosting circuit that boosts voltage of the control circuit power supply to predetermined voltage required for charging the capacitor; and
   a capacitor charging control circuit for controlling the charging of the capacitor, wherein:
      the control circuit power supply charges the capacitor through the control circuit board,
      the boosting circuit has a primary side connected to the capacitor charging control circuit, and
      the boosting circuit has a first terminal on a secondary side connected to the switch and a second terminal on the secondary side connected to an emitter potential of the upper arm.

2. The power converter according to claim 1, wherein the control circuit power supply charges the capacitor through the control circuit board and the power conversion element.

3. The power converter according to claim 2, wherein the voltage from the control circuit power supply is boosted to the predetermined voltage by the boosting circuit, and
   the capacitor is charged by supplying the current boosted to the predetermined voltage to the capacitor through the control circuit board and the power conversion element.

4. The power converter according to claim 3, wherein the switch is used for turning ON and OFF an operation of the boosting circuit, and
   the control circuit board turns ON the switch so that the capacitor is charged, and turns OFF the switch when the charging of the capacitor is completed.

5. The power converter according to claim 4, wherein the boosting circuit is a transformer,
   the capacitor charging control circuit is mounted on the control circuit board, and
   the upper arm and the lower arm each including a power conversion element formed by connecting a switching element and a recirculation element in parallel.

6. The power converter according to claim 5, wherein the recirculation element is a diode in inverse parallel connection with the switching element,
   the diode of the upper arm has a cathode connected to a positive side of the capacitor, and
   the transformer has the second terminal on the secondary side connected from the emitter potential of the upper arm to the positive side of the capacitor through the cathode of the diode.

7. The power converter according to claim 6, wherein secondary side current of the transformer that flows through the switch also flows at a portion having the same potential as the emitter potential of the upper arm.

8. The power converter according to claim 7, wherein the switch is turned OFF when the charging of the capacitor is determined to have completed, with voltage at both ends of the capacitor reaching predetermined stop voltage, which is set as voltage to stop the charging.

9. The power converter according to claim 8, wherein
   an upper arm driver that drives the power conversion element of the upper arm and a lower arm driver that drives the other power conversion element of the lower arm are mounted on the control circuit board,
   the upper arm driver is connected to each of a base potential and the emitter potential of the power conversion element of the upper arm,
   the lower arm driver is connected to each of a base potential and an emitter potential of the other power conversion element of the lower arm, and
   the transformer has the second terminal on the secondary side connected to a path of connection between the upper arm driver and the emitter potential of the power conversion element of the upper arm.

10. The power converter according to claim 9, wherein a power conversion operation by the power semiconductor module starts after the charging of the capacitor is completed.

11. The power converter according to claim 9, wherein the power converter is attached to a converter system that accommodates a plurality of power converters, after the charging of the capacitor is completed.

* * * * *